United States Patent
Ravindran et al.

(10) Patent No.: US 9,059,920 B2
(45) Date of Patent: Jun. 16, 2015

(54) METHOD AND APPARATUS FOR SELECTING BETWEEN AVAILABLE NEIGHBORS IN A RAPID ALTERNATE PATH CALCULATION

(75) Inventors: Ravi Ravindran, Ottawa (CA); Peter Ashwood Smith, Hull (CA); Hong Zhang, Kanata (CA)

(73) Assignee: RPX Clearinghouse LLC, San Francisco, CA (US)

( * ) Notice: Subject to any disclaimer, the term of this patent is extended or adjusted under 35 U.S.C. 154(b) by 370 days.

(21) Appl. No.: 13/588,126

(22) Filed: Aug. 17, 2012

(65) Prior Publication Data

US 2012/0307625 A1  Dec. 6, 2012

Related U.S. Application Data

(63) Continuation of application No. 11/512,671, filed on Aug. 30, 2006, now Pat. No. 8,264,949.

(51) Int. Cl.
| | |
|---|---|
| *H04L 12/721* | (2013.01) |
| *H04L 12/701* | (2013.01) |
| *H04L 12/751* | (2013.01) |
| *H04L 12/705* | (2013.01) |
| *H04L 12/707* | (2013.01) |
| *H04L 12/703* | (2013.01) |
| *H04L 12/24* | (2006.01) |

(52) U.S. Cl.
CPC .................. *H04L 45/12* (2013.01); *H04L 41/06* (2013.01); *H04L 45/00* (2013.01); *H04L 45/02* (2013.01); *H04L 45/123* (2013.01); *H04L 45/18* (2013.01); *H04L 45/22* (2013.01); *H04L 45/28* (2013.01)

(58) Field of Classification Search
CPC ................ H04L 45/28; H04L 41/0654; H04L 2012/5627; H04L 47/10; H04L 47/11; H04L 45/00; H04L 45/02; H04L 45/12; H04L 45/123; H04L 45/18; H04L 45/22; H04J 2203/006
USPC .......... 370/216, 217, 225, 227, 228, 229, 242
See application file for complete search history.

(56) References Cited

U.S. PATENT DOCUMENTS 7,395,351 B1 * 7/2008 Nucci et al. .................. 709/242

* cited by examiner

*Primary Examiner* — Anh Ngoc Nguyen
(74) *Attorney, Agent, or Firm* — Anderson Gorecki & Rouille LLP

(57) ABSTRACT

A weighting process may be used to select between alternate neighbors in a RAPID calculation to enable policy and/or traffic engineering considerations to affect the selection of an alternate path through the network. The information used to weight the neighbors may static administratively assigned weighting information or dynamic weighting information such as local statistical traffic condition information. The process may take into account the amount of traffic being handled by the current primary next hop for the destination, the available capacity of the available alternate neighbors, the ability of the alternate neighbors to handle the additional traffic, and other considerations. Weighting may occur after a set of available loop free alternate neighbors has been determined. Alternatively, weighting may occur before the RAPID calculation has been performed to cause the neighbors to be ordered prior to RAPID processing. This may enable RAPID calculation to stop without considering all available neighbors.

19 Claims, 4 Drawing Sheets

METHOD AND APPARATUS FOR SELECTING BETWEEN AVAILABLE NEIGHBORS IN A RAPID ALTERNATE PATH CALCULATION

CROSS REFERENCE TO RELATED APPLICATIONS

This application is a continuation of U.S. patent application Ser. No. 11/512,671, filed Aug. 30, 2006 now U.S. Pat. No. 8,264,949, and is related to co-pending U.S. patent application Ser. No. 11/410,747, entitled Method And Apparatus For Simplifying The Computation Of Alternate Network Paths, filed on Apr. 25, 2006, the content of each of which is hereby incorporated herein by reference.

BACKGROUND OF THE INVENTION

1. Field of the Invention

The present invention relates to communication networks and, more particularly, to a method and apparatus for selecting between available neighbors in a RAPID alternate path calculation.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements. Protocol Data Units will also be referred to herein as packets.

There are several different types of network routing protocols, one class of which is commonly referred to as link state routing protocols. Link state routing protocols assign cost metrics to each link on the network, and the routers advertise the links and costs through the use of link state advertisements. The routers collect the link state advertisements and build a link state database containing information associated with links on the network. This network view enables the routers to compute lowest cost paths through the network to intended destinations. These calculations are performed in advance and then programmed into the data plane of the network element. In operation, when a packet arrives, the data plane will automatically forward the packet over the lowest cost path toward its intended destination. Several examples of routing protocols that operate in this manner include Intermediate System to Intermediate System (IS-IS) and Open Shortest Path First (OSPF), although other link state routing protocols exist and may be developed as well.

Network failures, such as link failures and node failures, may occur in a communication network. When a failure occurs, traffic that is intended to flow through the failure must be routed around the failure so that it is able to traverse the network. Many different ways of handling network failures have been devised over the years. For particular types of traffic, it is generally considered desirable or necessary to enable traffic to be switched to an alternate path with 50 milliseconds of failure on the primary path, so that real time traffic being carried by the network is not affected by the failure. While this is generally possible using physical layer protection switching, such as by switching traffic to a protection path using SONET equipment, it would be advantageous to be able to provide this type of protection at the routing layer.

When a failure occurs in a network implementing a link state routing protocol, the local router will react to the failure by generating and flooding new routing updates to other routers in the network, perhaps after a hold-down delay. Upon receipt of the routing update, all the routers in the network will re-compute routes through the network based on the new network topology. These routers will then load the revised forwarding tables into the forwarding hardware. The convergence time for this process to complete may be on the order of several seconds. Accordingly, use of the normal link state routing protocol path computation mechanisms to provide sub-50 ms failure recovery is generally not tenable.

One way to provide fast failover to an alternate network path is through the use of pre-computed alternate paths that are installed in the data plane along with the primary path. For example, when a router initially computes a path to a destination, the router may also assume a failure on its primary path and compute an alternate path to the destination at the same time. The alternate path may then be programmed into the data plane of the network element so that, if a failure on the primary path occurs, the alternate path may be used to forward traffic temporarily while new primary paths are being computed.

FIG. 1 shows a simplified example of a network 10 including six nodes 12 interconnected by links 14. The cost of the links in this figure will be assumed to be symmetric, and are shown as numbers on the links. In an actual implementation, the network may be much larger and include a larger number of nodes. In this example, traffic is flowing from R1 to R6. Initially, a shortest path 20 from R1 to R6 will be through nodes R2 and R3, since this path has a cost of 4.

FIG. 2 shows the network of FIG. 1 in which there has been a failure on the link between R2 and R3. Although R2 will sense the failure, R1 will not know of the failure and will continue to send traffic to R2 to be forwarded to R6. To enable R2 to continue to forward traffic to R6, R2 will have pre-computed an alternate path through the network and have programmed that alternate path into its data plane. For example, in the example shown in FIG. 2, the pre-computed alternate path may be to transmit the data to R4, which may then transmit the data to the destination (R6) over its own shortest path.

The failure on link 2 will eventually be advertised by R2 using a standard Link State Advertisement (LSA), so that each of the nodes on the network may recompute paths through the network using the updated network information. These new paths will then be used by the network elements in a standard manner. For example, since the path from R1 to R6 via R4 and R5 has a cost of 6, R1 will stop sending R2 traffic intended for R6 once the new paths are computed and installed by the network elements. Having pre-computed alternate paths, however, enables the network elements to continue forwarding traffic to intended destinations while the network nodes recompute new primary paths through the new network topography.

To determine which paths are able to be used to forward traffic in this manner, each router must determine which neighbors are loop free. In the networks shown in FIGS. 1 and 2, R4 is loop free because the distance from R4 to R6 is less than the distance from R4 to R2 plus the distance from R2 to R6. Stated another way, when R2 sends traffic to R4 to be forwarded to R6, R2 needs to know that the shortest path from R4 to R6 does not require R4 to forward traffic back through R2. Since R4 will not know of the failure on the link from R2 to R3, having R4 return the traffic to R2 would cause a routing loop to occur, and would defeat the purpose of trying to send out the traffic to R6 via an alternate path through the network. Accordingly, to enable alternate path routing to be enabled, each router must determine which of its neighbors has a lowest cost path to a particular destination that does not cause traffic to be forwarded back through it, i.e., the nodes must determine which neighboring routers are on loop free paths to the intended destination. The well-known Dijkstra algorithm may be used to perform this calculation.

FIG. 3 shows an example where it will be assumed that R2 does not have any loop-free neighbors. In this case, R2 may be able to use router R1 as its alternate path if router R1 is configured to enable U-turns to occur in the event of a failure on the network. Enabling U-turns of this nature is also described in greater detail in U.S. Patent Application Publication No. US2005/0073958A1, the content of which is hereby incorporated herein by reference. Essentially, U-turns enable the number of source/destination pairs that are protected on the network to be increased. To enable U-turns, R1 must be capable of breaking U-turns, and must have a loop free node-protecting alternate path to reach the destination.

Once the node has determined which neighbors provide loop-free alternate paths, the node must select one of the neighbors to be used for the alternate path. Conventionally, this has been done by looking for neighbors with paths to the destination that avoid the immediate downstream node, such as node R3 in the illustrated example. Where there is more than one such neighbor, or where no neighbor's path avoids the immediate downstream node, the selection of a neighbor from equally preferable available neighbors has been random or based on the link weights used for the shortest path calculation. While this is straightforward and easy to implement, it may be advantageous to provide an alternate mechanism for discerning between available neighbors in a RAPID calculation.

SUMMARY OF THE INVENTION

A weighting process may be used to select between alternate neighbors in a RAPID calculation to enable policy and/or traffic engineering considerations to affect the selection of an alternate path through the network. The information used to weight the neighbors may static, for example network administrator assigned preference information, or dynamic such as local traffic statistic information. The process may take into account the amount of traffic being handled by the current primary next hop for the destination, the available capacity of the available alternate neighbors, the ability of the alternate neighbors to handle the additional traffic, and other similar considerations that are able to be derived from the local traffic statistic information. The process may select one neighbor or a group of neighbors to serve as alternates for a given destination. Weighting may occur after a set of available loop free alternate neighbors has been determined. Alternatively, weighting may occur before the RAPID calculation has been performed to cause the neighbors to be ordered prior to RAPID processing. In this embodiment the first neighbor that is found to be a loop free alternate or U-turn loop free alternate may be selected as the alternate path to the destination and processing of the remaining neighbors may be stopped to reduce the computational complexity of the RAPID process.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Reliable Alternate Paths for IP Destinations (RAPID) sets forth a process whereby, for each destination, a node will calculate which of its neighbors may be used to forward traffic to the destination upon occurrence of a failure in the network. According to an embodiment of the invention, once a set of alternate neighbors has been determined using this process, selection between those alternate neighbors may look at operator specified policy weightings or dynamic network usage information to select from the available alternate neighbors. The preferential selection process may take place on all available neighbors or may take place first on loop free neighbors and then on U-turn neighbors. Alternately, the neighbors may be ranked first and then checked, in order, to determine which of the neighbors is loop free and most preferable.

Figure 1:
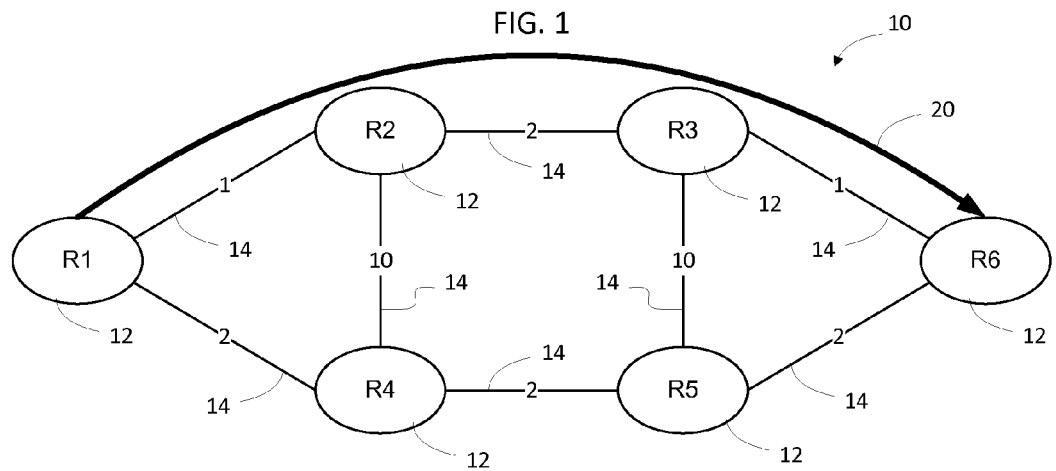
FIG. 1 is a functional block diagram of a portion of an example communication network showing an initial path through the network.
Figure 2:
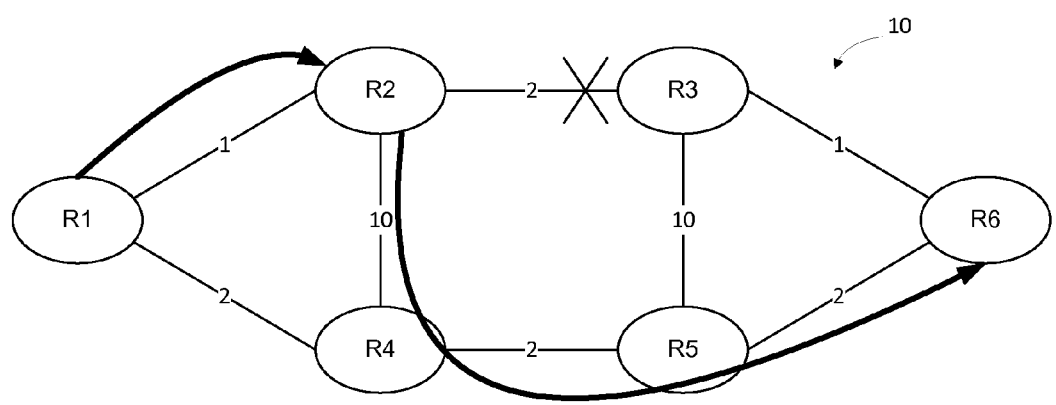
FIG. 2 is a functional block diagram of the network of FIG. 1 showing an alternate path through the network via a neighboring node.
Figure 3:
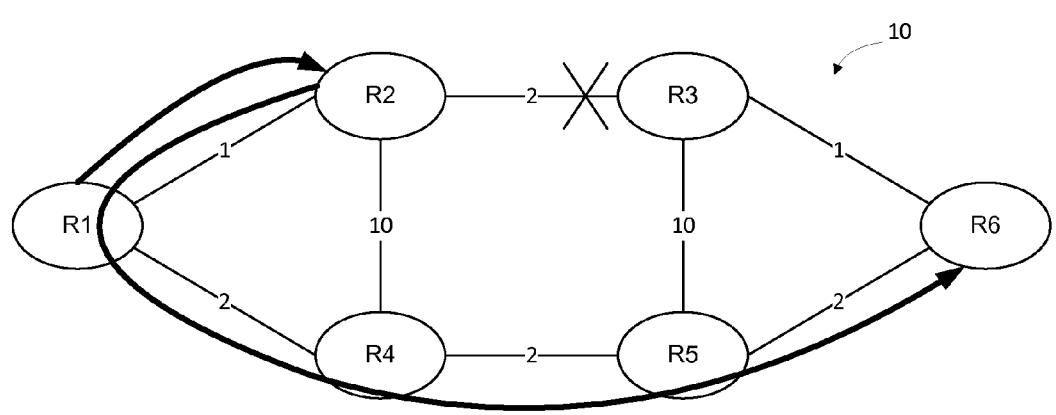
FIG. 3 is a functional block diagram of the network of FIG. 1 showing an alternate path through the network that relies on a U-turn.
Figure 4:
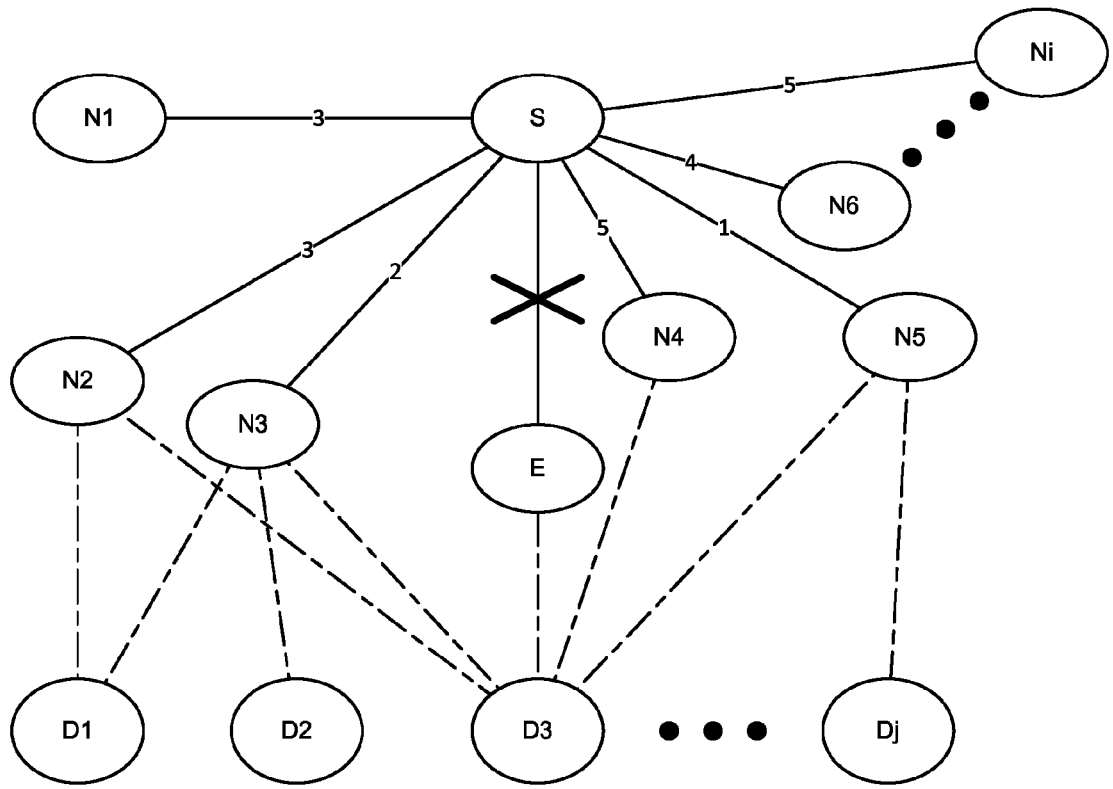
FIG. 4 is a functional block diagram of a network in which a sending node has a large number of neighboring nodes.

FIG. 4 illustrates a portion of an example of a network in which a source node S has a large number of neighbors N1-Ni that may potentially be able to forward traffic to destination nodes D1-Dj upon failure of primary next hop E. To determine which neighbors may be used to forward traffic to a particular destination, the source node S will determine which of the neighbors are able to provide a loop free alternate path to the destination. Determining which neighbors provide loop free alternate paths is well known in the art, as described above. In the example network illustrated in FIG. 4, neighbors N2 and N3 are capable of serving as alternates to destination D1, neighbor N3 is capable of serving as an alternate to destination D2, neighbors N2, N3, N4, and N5 are capable of serving as alternates to destination D3, and neighbor N5 is capable of serving as an alternate to destination Dj. Additionally, one or more of neighbors N1-Ni may be a U-turn neighbor.

Focusing on destination D3, in this example there are four neighbors that may serve as alternate next hops should primary next hop E fail. According to an embodiment of the invention, the node S may select one or more of these neighbors to be used as alternates from this set of loop free neighbors by using static or dynamic policy weighting information. Additional information associated with the manner in which one of the neighbors is selected is presented below.

Figure 5:
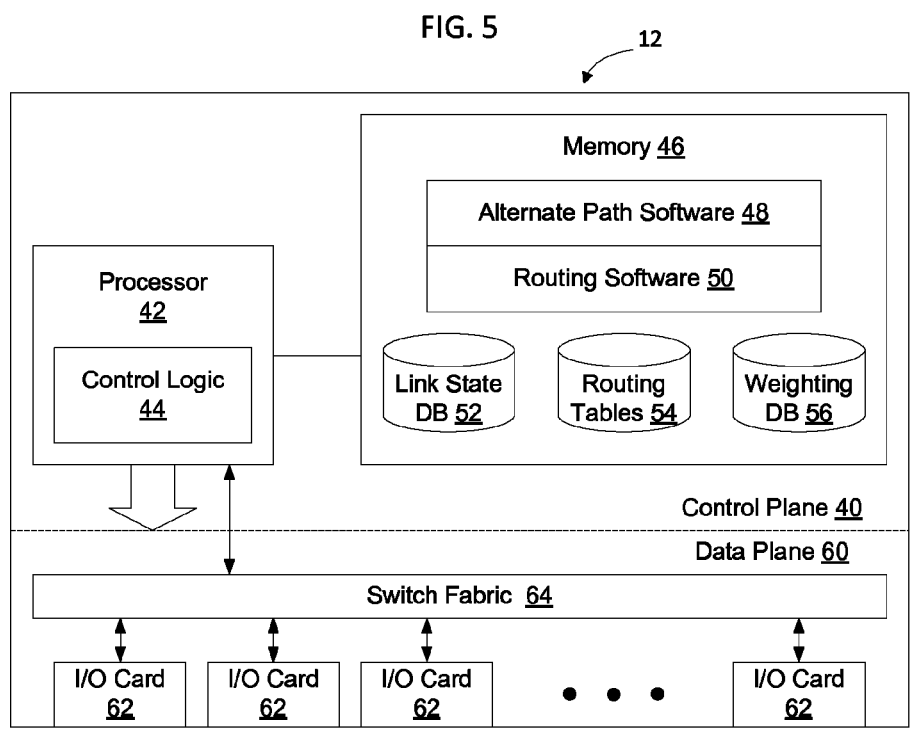
FIG. 5 is a functional block diagram of a network element according to an embodiment of the invention.

FIG. 5 shows an example of a network element 12 that may be configured to implement an embodiment of the invention. As shown in FIG. 5, the network element 12 includes a control plane 40 and a data plane 60. The control plane 40 is generally configured to instruct the data plane 60 how to handle data on the network. The data plane 60 is generally configured to handle high speed data traffic, such as packet traffic on an IP network. For example, the data plane may include one or more I/O cards 62 interconnected by a switch fabric 64. Routing tables, including alternate paths determined via the alternate path calculation process described herein, may be programmed into the data plane to enable the data plane to handle data on the network. Many data plane architectures may be used in connection with the network element of FIG. 5, and the invention is not limited to a particular data plane architecture selected to implement an embodiment of the invention.

The control plane 40, in this embodiment, includes a processor 42 containing control logic 44 that is able to be programmed to enable the network element to perform the functions described herein to compute alternate paths through the network. For example, the network element may contain a memory 46 containing software such as alternate path software 48 and routing software 50 configured to enable the network element to select primary and alternate paths to destinations on the network.

The memory may also contain one or more tables, such as link state database 52 that contains the data to be used by the routing software 50 and/or alternate path software 48 to enable the network element to calculate which neighbors may provide loop free alternate paths to the destinations. The memory may also contain a copy of the current routing tables 54 that have been programmed into the data plane, and other information commonly maintained by the network element to enable it to function on the network. To enable the network element 12 to select between available neighbors that can provide loop free alternate paths, the network element may also have a weighting database 56 containing static policy information and/or a dynamic weighting information. It should be understood that the invention is not limited to a network element configured in the manner discussed above, as numerous other architectures may be used to create a network element.

Figure 6:
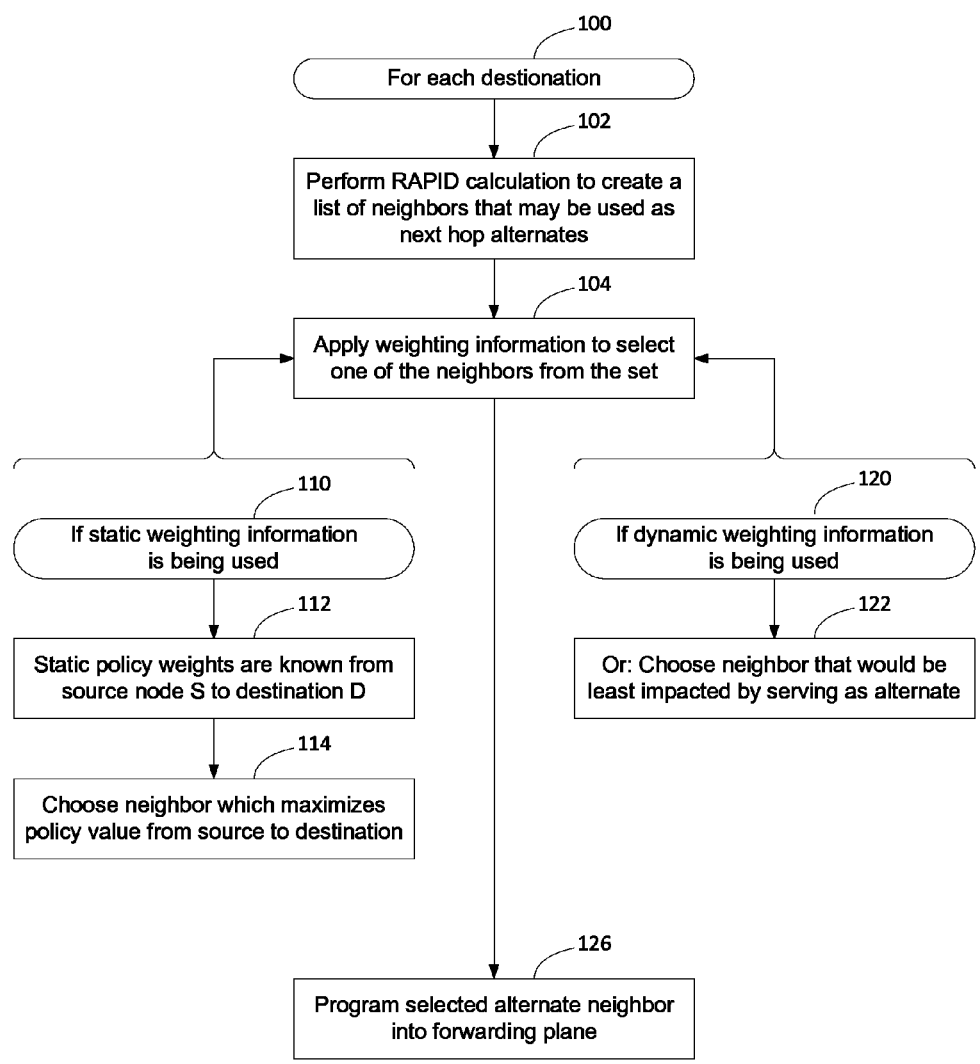
FIG. 6 is a flow chart illustrating a process of selecting an alternate network path according to an embodiment of the invention.
Figure 7:
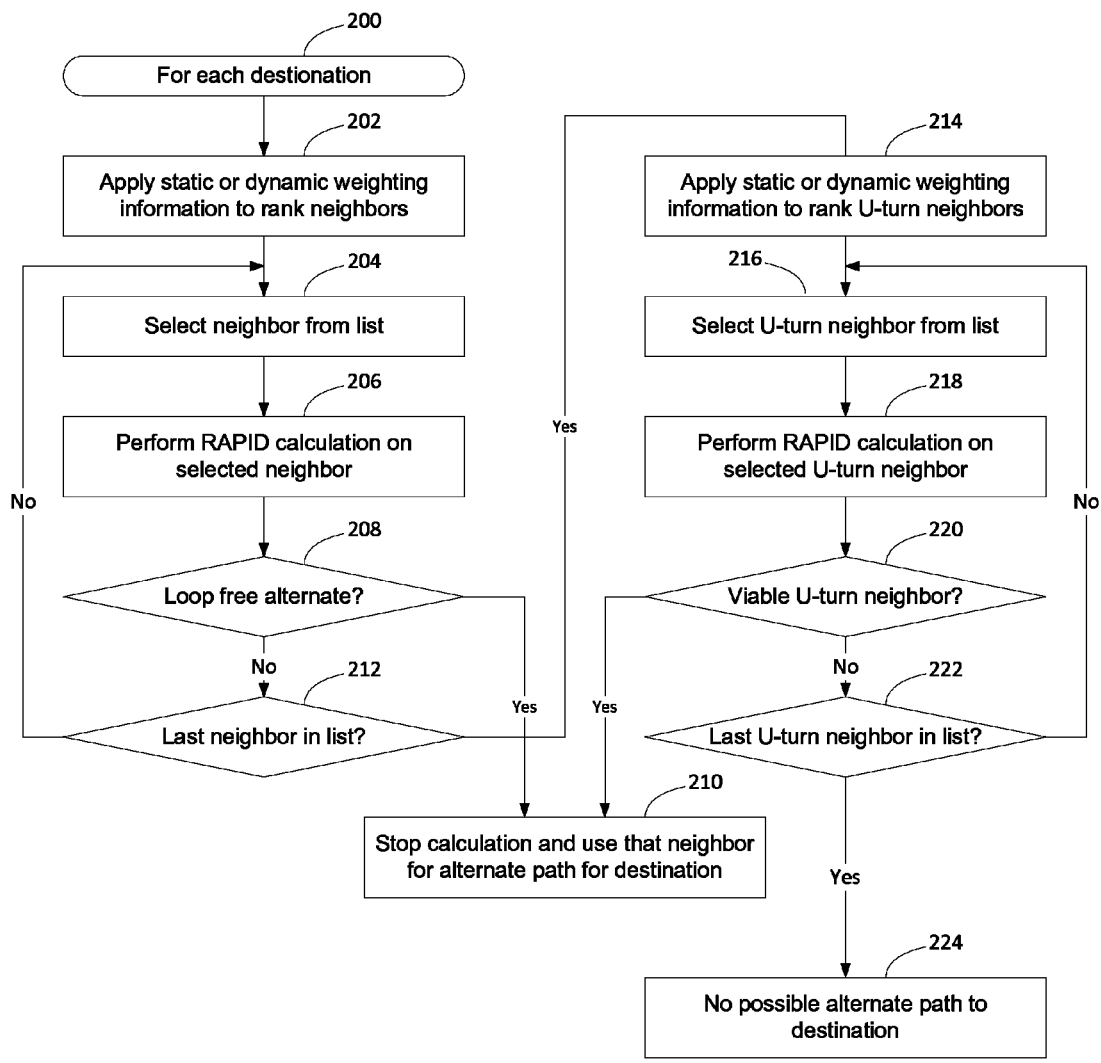
FIG. 7 is a flow chart illustrating a process of selecting an alternate network path according to another embodiment of the invention.

According to an embodiment of the invention, once a set of potential loop free alternate neighbors has been calculated, one or more of the loop free alternate neighbors is selected by applying a set of static or dynamic weights. FIGS. 6 and 7 illustrate two of possible ways in which this may be implemented by the alternate path software 48 according to embodiments of the invention.

In the embodiment shown in FIG. 6, for each destination D (100), the alternate path software will perform a RAPID calculation to determine a set of potential loop free alternate neighbors that may be used as next hop alternates should there be a failure on the primary path through primary neighbor E (102). If no neighbor may provide a loop free alternate path, the alternate path software may determine whether there are any neighbors that can provide a U-turn alternate path. Once the set of possible next hop alternates (or U-turn alternates) has been found, weighting information will be applied to select one of the neighbors from the set. Optionally, available loop free neighbors may be further divided into two groups according to whether they provide a node protecting loop free path to the destination or a link protecting loop free path to the destination, before applying weighting information to select between the available loop free or U-turn neighbors.

The step of applying weighting information to select one of the neighbors from the set may be performed in a number of different ways, depending on the type of weighting information to be applied. For example, the alternate path software may apply static weighting information such as administratively assigned policy link weights (110) that have been assigned by a network manager (112). Static weights may enable pre-determined secondary policy weights to be used as link weights so that the nodes on the network may determine the path to the destination that uses the highest valued alternate path. For example, assume in FIG. 4 that the network manager had assigned the values set forth in Table I to the links from node S to each of the neighboring nodes N1-Ni. The assigned policy values are also shown on the links in FIG. 4 for convenience.

TABLE I

| Link | Value |
| --- | --- |
| S → N1 | 3 |
| S → N2 | 3 |
| S → N3 | 2 |
| S → N4 | 5 |
| S → N5 | 1 |
| S → N6 | 4 |
| S → Ni | 5 |

In the first part of the process, the alternate path software will determine which of the nodes N1-Ni is a loop free alternate. In the example shown in FIG. 4, with respect to destination D3, nodes N2, N3, N4, and N5 are all potential loop free alternates. Hence, the alternate path software 48 will form a set N containing nodes N2, N3, N4, and N5.

The alternate path software will then look into the static policy table and determine that Node N2 has a value of 3, Node N3 has a value of 2, Node N4 has a value of 5, and Node N5 has a value of 1. Assuming that the alternate path software is looking for the node that has the highest policy value (114), the alternate path software will choose node N4 as the alternate neighbor for destination D3. If the alternate path software was configured to look for the node with the lowest policy value, the alternate path software would have chosen node N5 since that node has the lowest policy value.

A situation may arise where the weighting process of selecting between neighbors using the static weighting information (or the dynamic weighting information discussed below) results in a determination that two or more neighbors are equally preferable. In this situation, a mechanism similar to Equal Cost Multipath Protocol (ECMP) may be used to select one of the neighbors as an alternate. Other mechanisms of breaking a tie may be used as well and the invention is not limited to the use of a mechanism similar to ECMP.

Once the alternate has been selected, the process will end with respect to this destination and the alternate path will be programmed into the data plane (106) in a conventional manner so that the network element may use the alternate path upon occurrence of a failure on the network.

Optionally, to enable alternate paths to be distributed across multiple neighbors, the policy values may change periodically as new destinations are considered by the alternate path software. For example, it may not be desirable from a traffic engineering standpoint to cause all traffic from a given node to pass through a single alternate neighbor. If the policy information is such that a particular neighbor has a high (or low) policy value, that neighbor will be preferentially selected over other neighbors whenever the neighbor is able to provide a loop free alternate path to a particular destination. Accordingly, when a neighbor is selected to provide a loop free alternate path, the policy value associated with that neighbor may be reduced (or increased) by a particular value for a number of destination calculations so that other neighbors are more likely to be selected as alternates for some of the other destinations.

For example, assume as set forth in Table I above, that node N4 has been selected as an alternate for destination D3. The value associated with node N4 may be reduced by 3 during the subsequent calculation of alternates for destination D4 so that, if node N4 is part of the set N for destination D4, it is less likely to be selected as an alternate. The reduction in policy value may decay over time to return the policy value associated with node N4 to its original value if it has not recently been selected as an alternate. Other ways of adjusting the policy values may be used as well to help distribute the traffic on the network and the invention is not limited to this particular implementation.

Although the weighting table in this embodiment shows only one level of policy information, the invention is not limited in this manner as policy values on other links between the source and the destination may be considered as well. Thus, the alternate path software may be configured to sum the policy values on the links between the source and destination rather than simply looking at the policy value on the link between the source and the loop free neighbor.

The weighting process may use dynamic weighting information as well as or instead of static weighting information (120). Dynamic weighting information may be information relating to network conditions, such as local traffic statistic information. The local traffic statistic information may include information as to how much traffic is being handled by the node S for the destination D, the capacity of the neighbors, the amount of traffic being handled by the neighbors, the total or percentage residual capacity on the neighbors, or other information relating to traffic patterns on the network. Optionally, traffic engineering information may be used when available.

As shown in FIG. 6, there are several ways to use dynamic weighting information to select a neighbor from available neighbors on the network. For example, dynamic weighting information may be used to select a neighbor that would be likely to be least impacted by being required to handle traffic from the source to the destinations (122).

To choose the neighbor that would be least likely to be impacted by handling the traffic, the alternate path software may determine the amount of traffic being handled by the source node S for the destination D, and look for neighbors with residual capacity that approximates that amount of traffic. Alternatively, the alternate path software may look for neighbors with the largest amount of residual capacity and assign the neighbor with the largest residual capacity as the alternate for that destination. The largest residual capacity may be measured in terms of absolute capacity, percentage capacity, or in another way.

For example, if the current primary next hop E is handling 100 Mbps of data to destination D3, and only node N3 was capable of handling an additional 100 Mbps of data, then node N3 would be preferentially selected over the other nodes that are capable of providing a loop free alternate path to destination D3. As capacity on neighboring nodes is allocated, the dynamic weighting information database 56 may be updated to reflect these assignments so that available capacity on neighboring nodes is not oversubscribed.

Selection of neighbors may take place as each destination is considered or, alternatively, may take place after all destinations have been considered. For example, the alternate path software may compute which neighbors are able to provide loop free alternate paths to each of the destinations and then assign neighbors to each destination once the calculations have completed. Assigning neighbors in this manner may enable available capacity on neighbors to be better allocated, particularly where there are only one or a few neighbors that are able to reach some of the destinations. For example, referring to FIG. 4, node N5 is able to provide a loop free alternate path to destinations D3 and Dj, whereas the other neighbors in this example are not able to reach node Dj.

To enable a full set of loop free alternate paths to be selected, it may be desirable to assign neighbor N5 as the alternate for traffic to destination Dj and then adjust the dynamic weighting information database to reflect that assignment before selecting an alternate for traffic intended to destination D3. In this manner, if node N5 has only sufficient capacity to provide an alternate path to either D3 or Dj, and other nodes such as nodes N2, N3, or N4 are able to provide an alternate path to destination D3, those other nodes may be able to be assigned so that a complete set of alternate paths may be found.

Although particular examples of ways in which static weighting information and dynamic weighting information have been provided to help explain operation of embodiments of the invention, the invention is not limited to these particular embodiments as other embodiments may use other types of static, dynamic, or both static and dynamic weighting information.

Similarly, although the foregoing description has described a process that may be used to select a single alternate neighbor, the invention is not limited in this manner as groups of neighbors may be selected to serve as an alternate using the weighting process described herein, and the traffic to the destination may be split between the several alternates in the group. Thus, the invention is not limited to an embodiment where weighting information is used to select only one neighbor from a group of possible alternate neighbors but rather extends to an embodiment in which the weighting information is used to select two or more neighbors that will collectively provide an alternate loop free path to a given destination. For example, where a subset of neighbors has sufficient residual capacity to handle traffic to a particular destination, those in the subset may be selected to provide the alternate path to the destination.

Once the neighbor or neighbors has been selected, the selection will be programmed into the data plane (126). Programming of a single alternate into the data plane may be performed in any desired manner, depending on the configuration of the data plane, and the invention is not limited to any particular manner in which the data plane is programmed. Similarly, multiple alternates may be programmed into the data plane using known techniques, such as by using Bloom filters, and the invention is thus not limited to any particular way in which multiple alternates are programmed into the data plane.

In the description provided above with respect to the step of performing the RAPID calculation (102), the alternate path software may perform a RAPID calculation on each of the available nodes or, alternatively, may preferentially perform the RAPID calculation on fewer than all nodes as discussed in greater detail in copending U.S. patent application Ser. No. 11/410,747 the content of which is hereby incorporated herein by reference.

In the embodiment shown in FIG. 6, it was assumed that the weighting process would be performed after a set of loop free alternate neighbors had been determined. The invention is not limited in this manner, however, as the weighting process may also be performed before a set of loop free alternate neighbors has been determined, to preferentially rank the neighbors for processing.

FIG. 7 shows an example of alternate embodiment in which the weighting process is performed first and then the alternate path software performs a Dijkstra calculation to determine whether the neighbor is a loop free alternate path or U-turn alternate path to the destination. Using the weighting process to order the neighbors may enable the calculation of alternate network paths to terminate once the node finds a single loop free alternate to the destination to thereby reduce the amount of calculation required to find a set of alternate paths to the node's destinations. If a loop free alternate is not able to be found, the process optionally may be used to rank the available U-turn neighbors, and determine if any of the U-turn neighbors are able to provide an alternate path to the destination.

As shown in FIG. 7, for each destination (200) the alternate path software will apply static or dynamic weighting information to rank the neighbors (202). The ranking process, in this step, will assume that all neighbors are loop free, and will rank the neighbors using static weighting information, dynamic weighting information, or both, as discussed in greater detail above in connection with FIG. 6. In an embodiment where the ranking process ranks the nodes the same for all destinations, the ranking process may be omitted for subsequent destinations once it has been performed the first time.

Once the neighbors have been ranked, the alternate path software will select the highest ranked neighbor in the list (204) and perform the RAPID calculation on the neighbor to determine if it will provide a loop free alternate path to the destination (206). As a result of the RAPID calculation, the alternate path software will be able to determine whether the highest ranked neighbor provides a loop free alternate (208). If the highest ranked neighbor does not provide a loop free alternate to the destination, the alternate path software will check to see if the neighbor that was just processed is the last neighbor in the list (210). If there are additional neighbors in the list, the alternate path software will return and process the next neighbor in the list. The alternate path software will iterate this process until a loop free alternate has been found (210) or until the last neighbor has been considered (212). If a loop free alternate is found, calculation will be stopped and that neighbor will be used for an alternate path to the destination (210).

If no loop free alternate is found, then similar processing may be performed to find the most preferred U-turn alternate. For example, as shown in FIG. 7, the alternate path software in this embodiment will apply static or dynamic weighting information to rank the U-turn neighbors (214). The alternate path software will then select a U-turn neighbor from the list (216) and perform a RAPID calculation on the selected U-turn neighbor (218). Processing of U-turn neighbors is known in the art and a detailed description of the particular processing that is required to determine whether a neighbor may serve as a U-turn alternate to a particular destination has thus been omitted.

If the considered U-turn neighbor is able to break a U-turn and provide a loop-free path to the destination (220) the calculation will stop and that U-turn neighbor will be used as an alternate path for that destination. If not, the alternate path software will determine if the considered neighbor was the last U-turn neighbor in the list (222). If the considered neighbor was not the last U-turn neighbor in the list, the process will select another U-turn neighbor and iterate until it finds a viable U-turn neighbor or it reaches the end of the list of the U-turn neighbors. If the alternate path software reaches the end of the list without finding a viable U-turn neighbor, it will conclude that there is no possible alternate loop free neighbor or U-turn neighbor that can serve as an alternate for the destination (224) and move on to consider the next destination.

Although an example was described in which U-turn neighbors were considered separately from other neighbors, the invention is not limited in this manner as all neighbors may also be grouped together and ranked accordingly. For example, in some instances the highest ranked U-turn neighbor may be more preferable than the lowest ranked regular neighbor. In this instance, ranking the regular neighbors and U-turn neighbors together may enable all neighbors to be grouped together onto one list and ranked accordingly. The fact that a particular neighbor is a U-turn neighbor may affect the ranking of that neighbor in the list in this embodiment.

Although an embodiment of the invention has been described in connection with an implementation in a routed IP network, the invention is not limited in this manner as it may also be used in other networks where a link state routing protocol is being used. For example, an embodiment of the invention may be used in connection with a routing bridge (RBridge) network running a link state routing protocol such as IS-IS. Accordingly, the invention is not limited to implementation on an IP network or in a router, but may also be implemented in other types of network elements such as switches or bridges.

The functions described above, including these described with respect to FIGS. 6 and 7, may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of calculating a loop-free alternate path through a network from a source node to a destination node, the method comprising:
   selecting a neighbor node of the source node based on weighting information determined by at least one of network policy and network traffic conditions; and
   calculating a loop free path through the selected neighbor node to the destination node;
   wherein selecting the neighbor node of the source node based on weighting information, comprises:
   ranking neighbor nodes of the source node based on the weighting information; and
   considering one neighbor node after another in decreasing order of ranking to determine whether the loop free alternative path from the source node to the destination node can be found.

2. The method of claim 1, wherein the weighting information comprises respective policy weights associated with the respective neighbor nodes to favor the use of some neighbor nodes over other neighbor nodes.

3. The method of claim 2, wherein the respective policy weights are assigned to respective links connecting the source node to the respective neighbor nodes to associate the policy weights with the respective neighbor nodes.

4. The method of claim 2, wherein the policy weights are statically assigned.

5. The method of claim 2, wherein the respective policy weight for a neighbor node is adjusted when an alternate route passing through the neighbor node is selected to provide an alternate path.

6. The method of claim 1, wherein the weighting information comprises respective traffic weights based on network traffic information associated with the neighbor nodes.

7. The method of claim 6, wherein the respective traffic weights are dynamically determined.

8. The method of claim 6, wherein the respective traffic weights are based on traffic being handled by neighbor nodes.

9. The method of claim 6, wherein the respective traffic weights are based on residual capacity of neighbor nodes.

10. The method of claim 6, wherein the traffic weights are based on statistical network usage information associated with the neighbor nodes.

11. The method of claim 6, wherein the respective traffic weight for a neighbor node is adjusted when an alternate route passing through the neighbor node is selected to provide an alternate path.

12. The method of claim 1, further comprising, upon finding a loop free alternate path:
   stopping consideration of neighbor nodes; and
   selecting the found loop free alternate path for use.

13. The method of claim 12, further comprising, upon not finding a loop free alternate path:
   ranking U-turn neighbor nodes based on the weighting information; and
   considering one U-turn neighbor node after another in decreasing order of ranking to determine whether a viable U-turn path from the source node to the destination node can be found.

14. The method of claim 13, further comprising, upon finding a viable U-turn path from the source node to the destination node:
   stopping consideration of neighbor nodes; and
   selecting the found viable U-turn alternate path for use.

15. The method of claim 13, further comprising, upon finding one of a loop free alternate path and a viable U-turn path:
   stopping consideration of neighbor nodes; and
   selecting the found one of a loop free alternate path and a viable U-turn path for use.

16. The method of claim 1, wherein the network is a packet switched network and the alternate paths are for the routing of packets through the network.

17. The method of claim 1, wherein the network is a link state protocol controlled network.

18. The method of claim 1, wherein the method is initiated responsive to a link failure on the network.

19. The method of claim 18, wherein the link failure is on a link between the source node and the neighbor node.

* * * * *